United States Patent [19]
DeLand

[11] Patent Number: 6,053,472
[45] Date of Patent: Apr. 25, 2000

[54] ROTARY SOLENOID OPERATED PROPORTIONAL FLOW CONTROL VALVE

[75] Inventor: Daniel L. DeLand, Davison, Mich.

[73] Assignee: Eaton Corporation, Cleveland, Ohio

[21] Appl. No.: 09/173,827

[22] Filed: Oct. 16, 1998

[51] Int. Cl.[7] .......................... F16K 31/04; F16K 31/524
[52] U.S. Cl. .................. 251/129.11; 251/251; 251/129.2
[58] Field of Search ............................... 251/129.11, 251, 251/129.2, 129.12; 137/1

[56] References Cited

U.S. PATENT DOCUMENTS

| | | |
|---|---|---|
| 5,551,406 | 9/1996 | Everingham et al. . |
| 5,624,100 | 4/1997 | Bolte et al. ..................... 251/129.11 X |
| 5,899,437 | 5/1999 | Quarre et al. ........................ 251/251 X |

*Primary Examiner*—Kevin Lee
*Attorney, Agent, or Firm*—Roger A. Johnston

[57] ABSTRACT

A rotary solenoid operated valve assembly having the rotary journalled in a ball race in one end of a tubular pole piece extending through a coil. The tubular pole piece has the end distal the ball race received in the bottom of a cup-shaped stator which has salient poles on the open rim and which define radial air gaps with poles formed on the rotor. A cam formed on the rotor moves a ball valve member in a direction transverse to the rotor axis for controlling flow over a valve seat provided in an inlet or outlet port. The rotor is balanced about its axis of rotation to prevent cam movement when the valve is subjected to vibration in a direction transverse to the rotor axis.

19 Claims, 6 Drawing Sheets

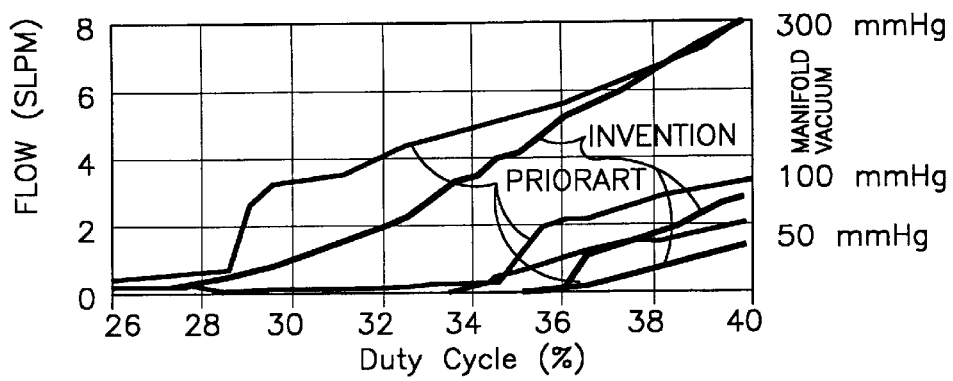
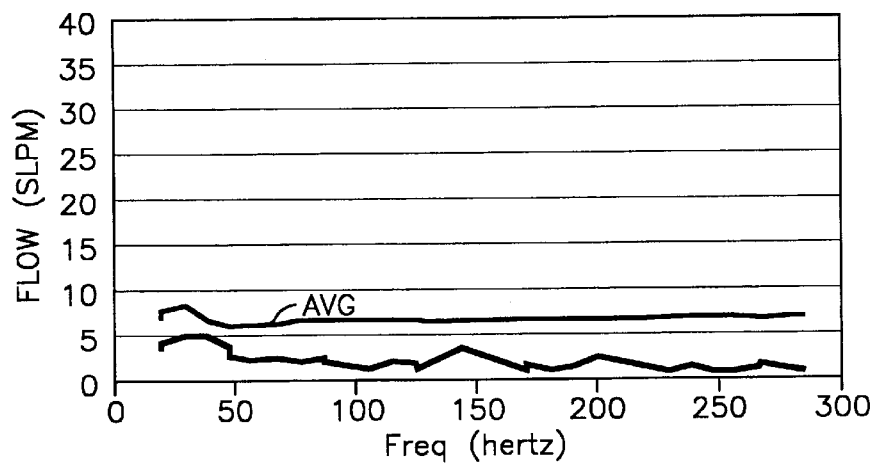
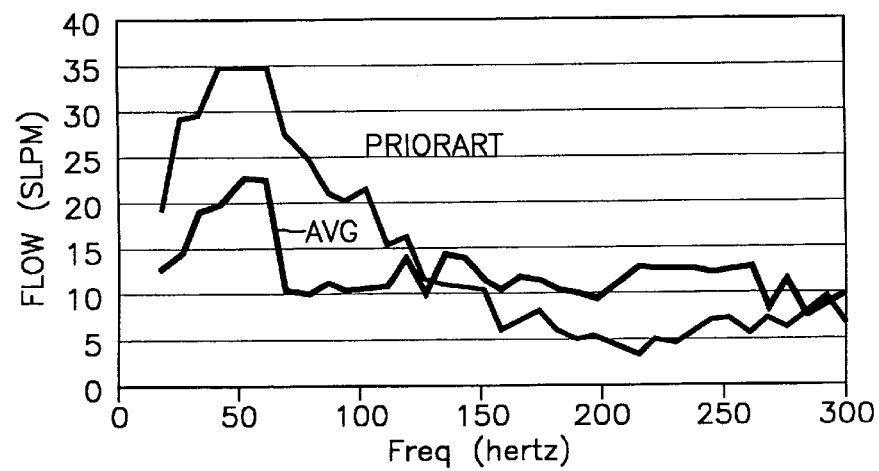

ROTARY SOLENOID OPERATED PROPORTIONAL FLOW CONTROL VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to electrically operated valves and particularly valves operated by an electromagnetic actuator of the type employed for flow control proportional to the level of an electrical control signal. Electrically operated proportional flow control valves are used in emission control systems for automotive engines and, in particular, are employed for electrically controlling the purge flow of fuel vapor from a charcoal filled storage canister into the engine intake manifold. In such applications, it is necessary to control the purge flow of fuel vapor from the canister electrically because the flow of fuel vapor from the canister can drastically alter the fuel air ratio of the engine in certain operating regimes; and, in some cases the purge vapor flow can cause erratic engine operation. The problem is particularly acute at low flow rates encountered at engine idle where the vapor flow from the storage canister can be a substantial portion of the fuel supply to the engine, and if not carefully controlled can result in engine stalling.

Heretofore, known electrically operated control valves utilized for controlling fuel vapor purge flow from a storage canister to an engine have utilized linear solenoid operators for effecting movement of a valve member for controlling the vapor flow from the canister to the engine intake. An example of this type of canister purge flow control valve is that shown and described in U.S. Pat. No. 5,551,406 issued to Everingham, et al.

Valves of the aforesaid type are typically operated by a linear solenoid and have the disadvantage of being erratic in at low-flow rates as shown in FIG. 8 where the upper set of curves for each of three levels of engine manifold vacuum are plotted as the purge vapor flow rate versus duty cycle of the electrical control signal. Furthermore, the linear solenoid valves of the prior art have been found to be particularly susceptible to vibration along the critical axis, namely the axis of the solenoid coil for a linear solenoid; and, such known valves have been found to be quite erratic over the range of vibration frequencies encountered in typical automotive applications as shown in the graphs in FIG. 10.

Thus, it has long been desired to find a way of electrically controlling fuel vapor canister purge flow to an engine in a motor vehicle application in a manner which provides linear or proportional control of the flow with the electrical signal and which is accurate at low flow ranges and is resistant to vibration.

BRIEF SUMMARY OF THE INVENTION

The present invention provides an electrically operated flow control valve intended for operation by a variable duty cycle or pulse width modulated (PWM) electrical control signal and is particularly suitable for low voltage operation as encountered in automotive fuel vapor canister purge control systems.

The flow control valve of the present invention has a rotary solenoid with a cam thereon which acts against a moveable, preferably spherical, valve member for permitting electrical control of the position of the valve member disposed in a valving chamber for controlling flow between an inlet port and an outlet port in the chamber.

The rotary solenoid operated valve of the present invention has the rotor journalled in a ball race provided in one end of a tubular pole piece received in the central region of the solenoid coil. The rotor has a plurality of ferromagnetic pole segments provided therein; and, the flux loop is completed about the coil by a cup-shaped ferromagnetic stator received over the coil with an aperture formed in the bottom of the cup-shape with one end of the pole piece received therein. The stator preferably forms salient poles for magnetically interacting with the rotor pole segments. The distal end of the rotor from the ball race has a substantially reduced diameter and includes a pin journalled in a sleeve bearing disposed within the tubular pole piece.

The rotor is biased in either a clockwise or counterclockwise direction as desired for a given cam configuration by a torsion spring; and, the rotor is balanced about its axis of rotation, preferably by counterweighting.

The rotary solenoid operated valve of the present invention provides improved resistance to vibration in the direction of the valve movement, which is transverse to the axis of the rotor by virtue of the balanced rotor arrangement. The reduced or minimal friction of the rotor journalling in the valve of the present invention permits accurate and repeatable positioning of the valve for low duty cycle or low coil current signals for low flow through the valve. The assembly of the valve provides for minimal manufacturing cost thereby rendering the valve suitable for high volume light motor vehicle applications.

BRIEF DESCRIPTION OF THE DRAWINGS

FIG. 8 is a graph of a family of curves for various engine manifold vacuums plotting flow in standard liters per minute as a function of electrical signal duty cycle;

FIG. 9 is a graph plotted for values of flow through the valve as a function of vibration frequency along the critical axis transverse to the rotor where the upper curve are average values and the lower curve represents data points including ripple; and, FIG. 10 is a graph similar to FIG. 9 plotted for a linear solenoid operated flow control valve of the prior art for an automotive fuel vapor canister purge control system.

DETAILED DESCRIPTION OF THE INVENTION

Figure 1:
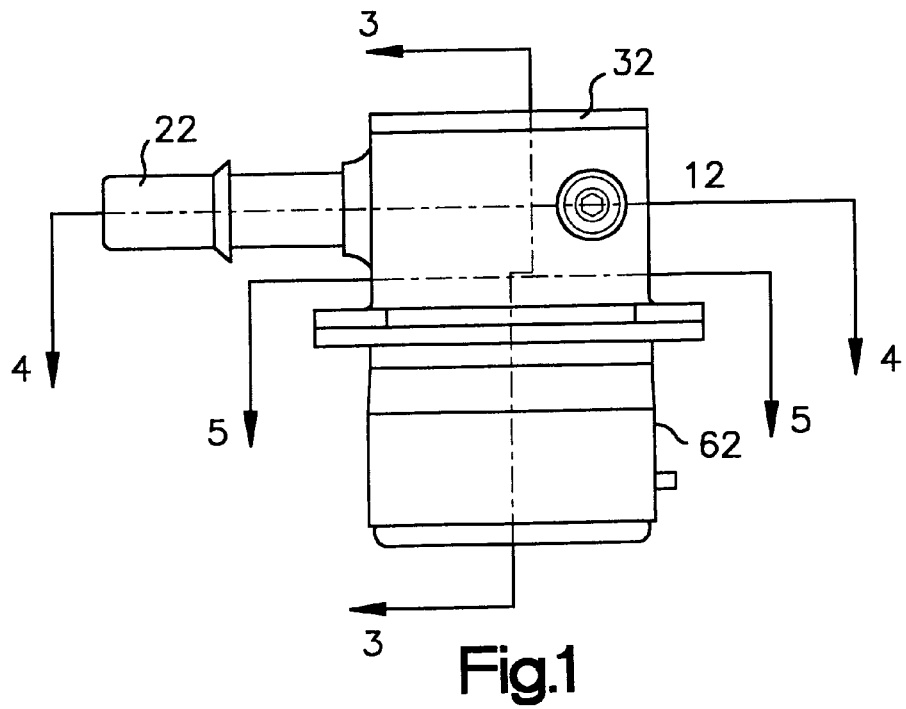
FIG. 1 is a side elevation view of the valve assembly of the present invention.
Figure 2:
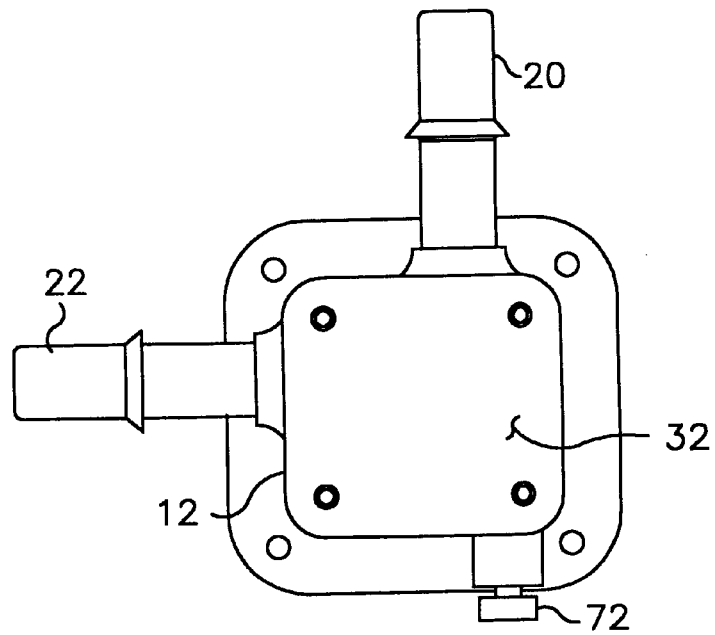
FIG. 2 is a top or plan view of the valve assembly of FIG. 1.
Figure 3:
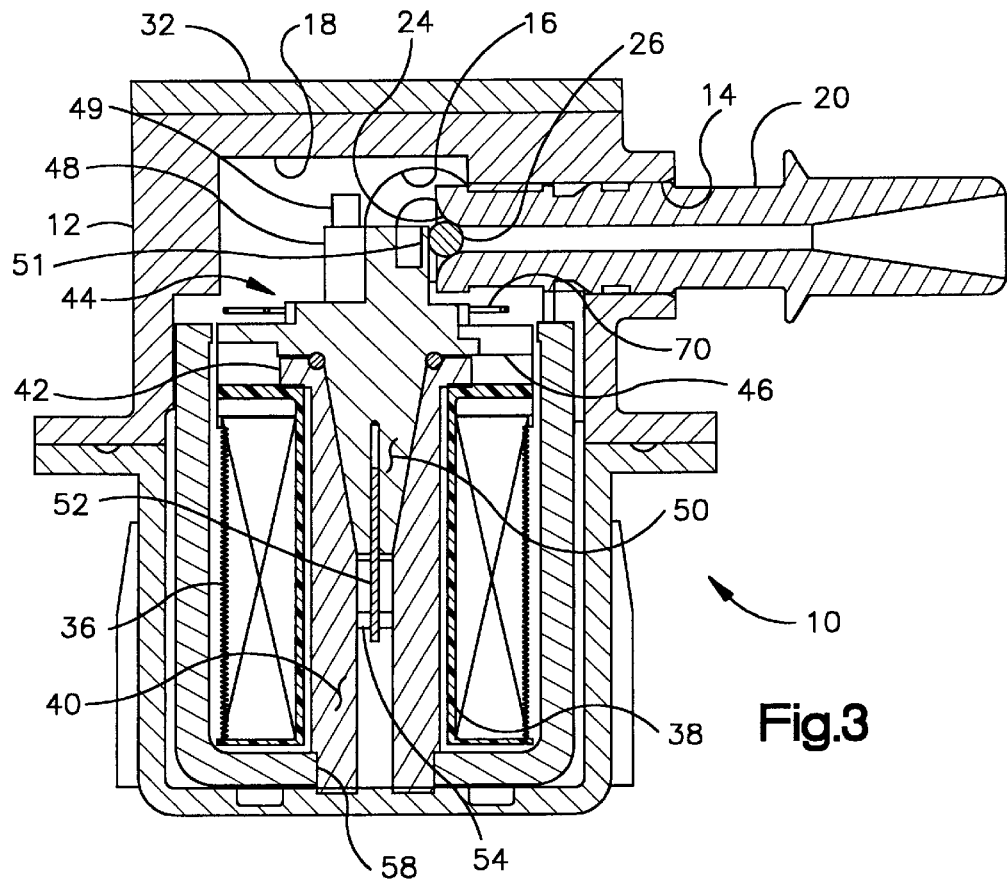
FIG. 3 is a section view taken along section-indicating lines 3—3 of FIG. 1.
Figure 4:
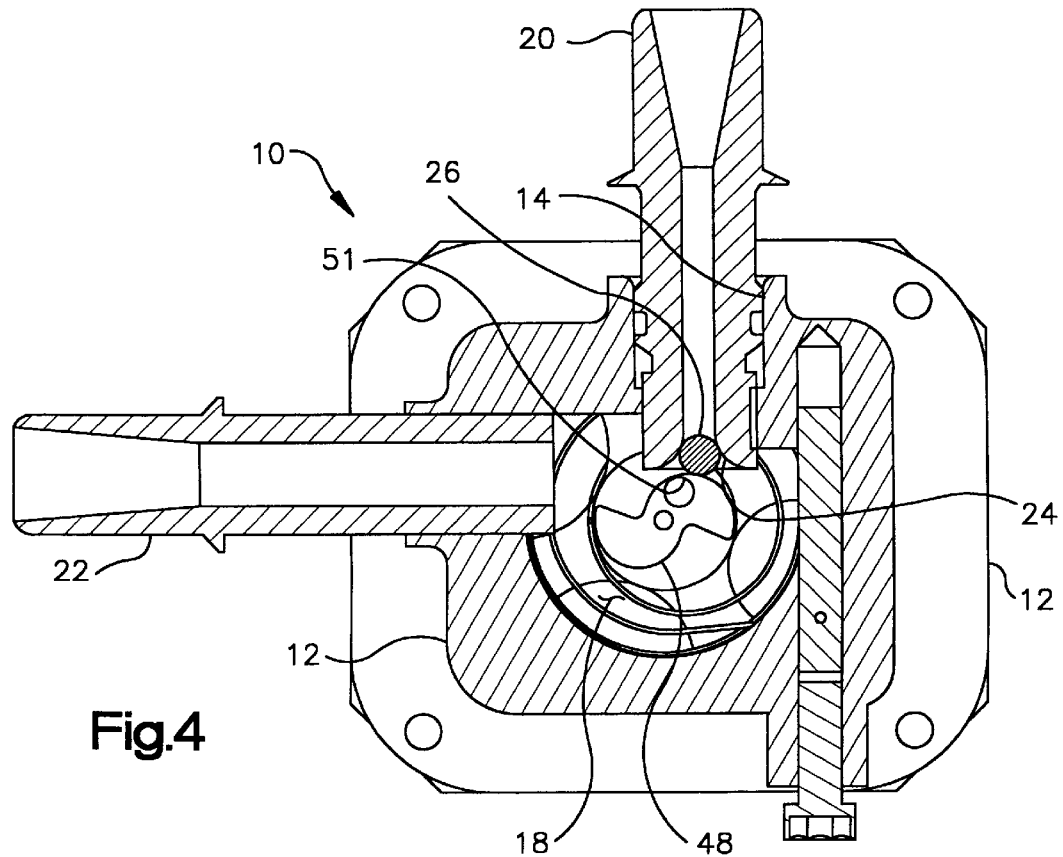
FIG. 4 is a section view taken along section-indicating lines 4—4 of FIG. 1.
Figure 5:
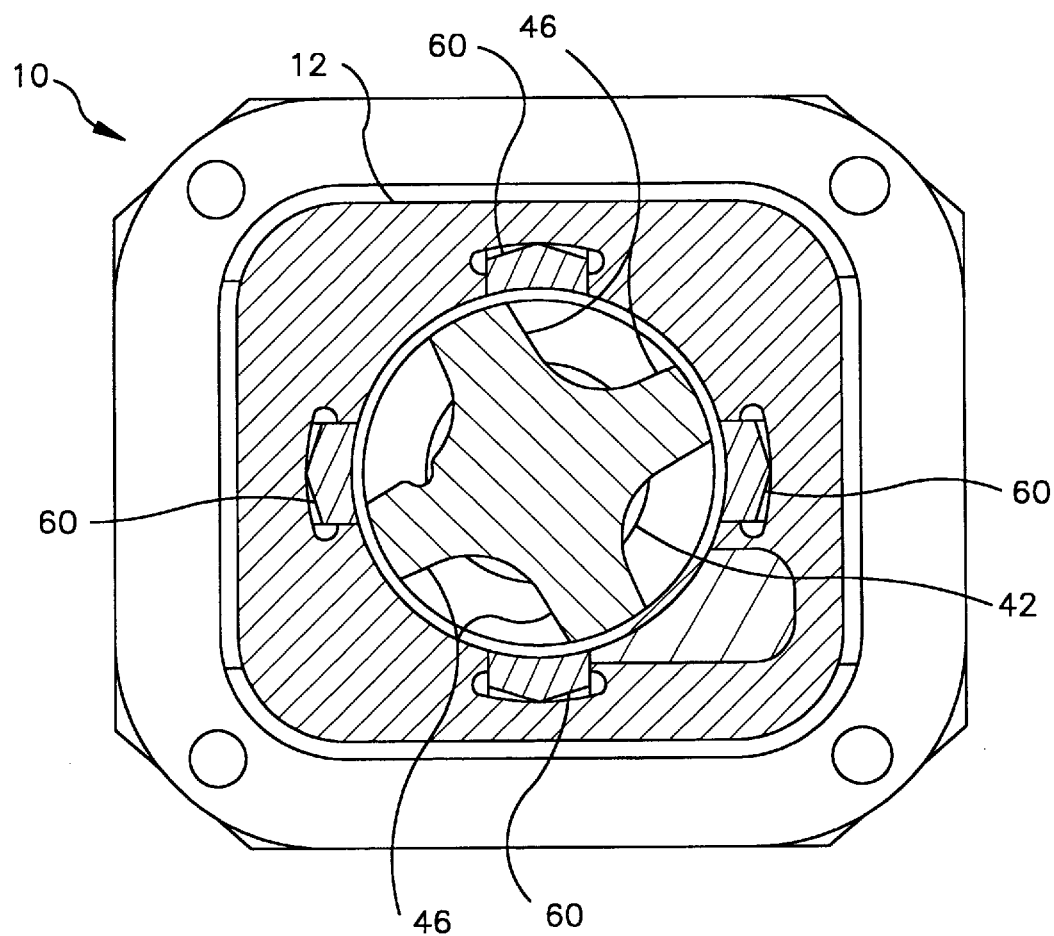
FIG. 5 is a section view taken along section-indicating liens 5—5 of FIG. 1.
Figure 6:
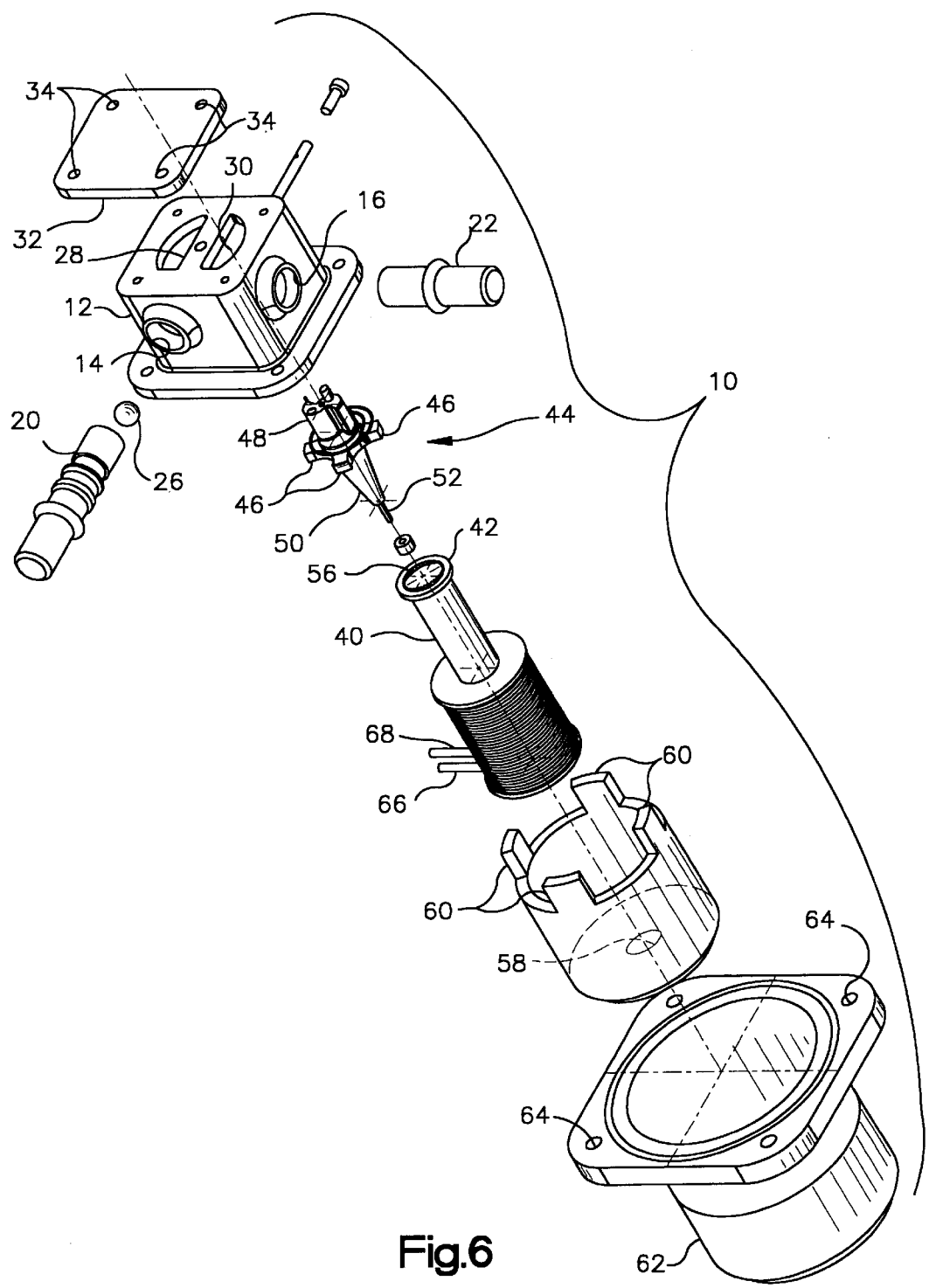
FIG. 6 is an exploded view of the valve assembly of FIG. 1.
Figure 7:
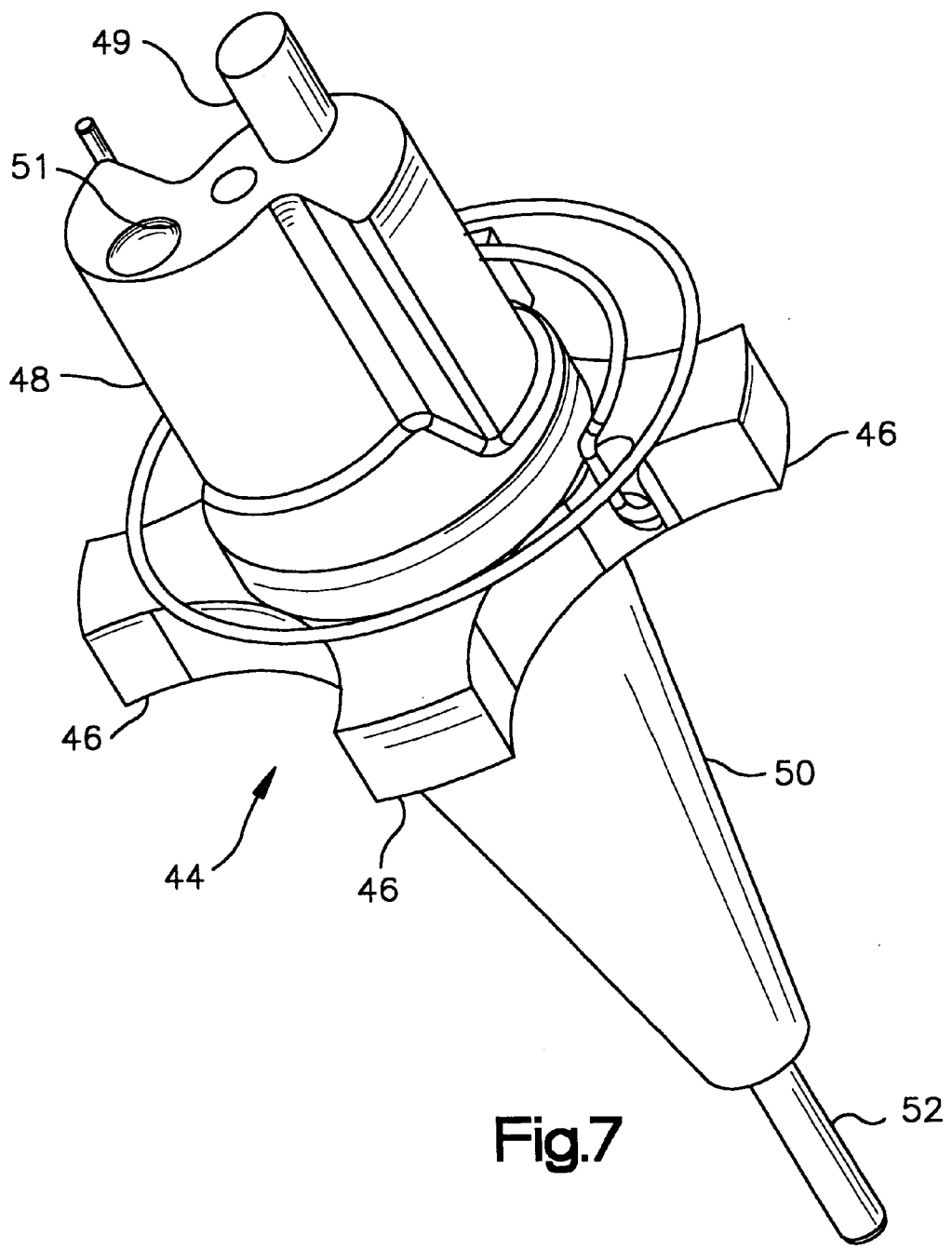
FIG. 7 is an axonometric view of the rotor.

Referring to FIGS. 1 through 7, the valve assembly of the present invention is indicated generally at 10 and includes a valve body 12 having an inlet port 14 and outlet port 16 communicating with the valve chamber 18 formed therein. Inlet port 14 has a suitable tube connector fitting 20 provided therein; and, the outlet port 16 similarly has a tube connector fitting 22 received therein. Fitting 22 is intended to be connected to an engine inlet manifold; and, fitting 20 is intended to be connected to a fuel vapor storage canister. The inner end 24 of inlet tube fitting 20 defines an annular valve seat against which is seated a moveable valve member 26 which preferably has a spherical configuration. Chamber 18 has access holes 28, 30 formed therein for calibration after assembly of the internal components and which are closed by a suitable cover 32 attached to body 12 by any suitable expedient as, for example, thread fasteners (not shown) through apertures 34.

A coil 36 is wound on a bobbin 38 which is received over a ferromagnetic tubular pole piece 40 having an annular flange 42 formed at one end thereof which registers against the upper end of bobbin 38. A rotor indicated generally at 44 has a plurality of circumferentially spaced discrete ferromagnetic pole segments 46 formed thereon and has a peripheral cam 48 disposed axially adjacent the rotor poles 46. The axial side of the poles 46 remote from cam 48 has a tapered configuration as denoted by reference numeral 50 and has provided in the smaller end thereof a pin 52 which is journalled in a sleeve bearing 54 pressed into a reduced diameter portion 56 of the bobbin 38. The annular flange 42 of the pole piece 40 has a ball race 56 received in the upper end thereof and onto which is journalled the rotor at the larger diameter upper end of taper 50.

The upper end of rotor 44 has a rotational counterbalancing weight 49 provided therein; and, if required, a counterbalancing hole 51 is drilled in the end of the rotor. Balancing the rotor about its rotational axis serves to prevent rotation of the rotor and cam 48 when the assembly 10 is subjected to vibration in a direction transverse to the rotor axis.

The flux loop about the coil is completed by cup-shaped ferromagnetic stator member 56 which has an aperture 58 formed in the closed end thereof into which is received the lower end of tubular pole piece 40. The upper open end of cup 56 has a plurality of salient magnetic stator poles 60 formed thereon which are nested over rotor poles 46 forming a radial air gap therebetween. A housing shell 62 of non-magnetic material is received over the coil cup 56 and is attached to the body 12 by suitable fasteners (not shown) through apertures 64.

The coil has connector terminal strips 66, 68 which are connected to opposite ends of leads of the coil winding 36 for external electrical connection thereto.

A torsion spring 70 is provided with one end anchored to a rotor segment and the other opposite end anchored to the valve body 12 for biasing the rotor to a desired valve open or closed position.

It will be understood that in operation upon energization of the coil, rotor 44 is caused to rotate by an amount determined by the coil current; and, the rotary movement of cam 48 causes linear movement of valve member 26 with respect to valve seat 24 for controlling flow between the inlet and outlet ports of the valve. The operation of the present valve thus utilizes the low friction movement of cam 48 against a spherical shaped valve member 26, thereby minimizing the resistance of the rotor to rotary movement and reducing hysteresis.

Referring to FIG. 8, the valve of the present invention was operated at three levels of engine manifold vacuum and provided accurate flow in the range zero to eight standard liters per minute as shown by the curves.

Referring to FIG. 9, the flow response in standard liters per minute of the present valve is plotted as a function of the frequency of vibration along its critical axis, which is normal to the access of rotation of the rotor, or in the direction of movement of valve member 26; and, it will be noted that the flow characteristics are substantially flat over the range of vibration encountered.

FIG. 10 represents flow characteristics of a prior art valve for a similar application when tested over the same range of vibrations. It will be noted that the variation in flow when subjected to vibration is substantial as compared to the flow characteristics shown in FIG. 9 of the valve of the present invention.

A calibration screw 72 is threadedly engaged in the body 12 and is operative to move pin 74 in guide bore 76 for calibrating the at-rest position of the rotor when the coil is not energized.

Although the invention has hereinabove been described with respect to the illustrated embodiments, it will be understood that the invention is capable of modification and variation and is limited only by the following claims.

What is claimed is:

1. An electromagnetically actuated valve assembly comprising:
   (a) a valve body defining a valving chamber having an inlet and an outlet port;
   (b) a rotor including a cam, and including a plurality of magnetically permeable pole segments, said rotor disposed for rotary movement with respect to said body;
   (c) a valve member disposed for movement with respect to one of said inlet and outlet port for controlling flow therebetween;
   (d) a coil including a tubular pole piece therein and operative upon electrical energization to effect said rotary movement of said rotor, wherein said cam surface effects said movement of said valve member; and,
   (e) a stator defining, in cooperation with said pole piece, a flux loop about said coil.

2. The valve assembly defined in claim 1, wherein said rotor is journalled for rotation on said tubular pole piece.

3. The valve assembly defined in claim 1, wherein said stator includes a generally cup-shaped member with said coil received therein.

4. The valve assembly defined in claim 1, wherein said rotor is journalled with a ball race on said tubular pole piece.

5. The valve assembly defined in claim 1, wherein said stator means includes a cup-shaped member defining a plurality of stator pole segments corresponding in number to the number of said rotor pole segments.

6. The valve assembly defined in claim 1, wherein said valve member has a spherical configuration.

7. The valve assembly defined in claim 1, wherein said rotor includes a torsion spring operable to bias said cam surface in a direction opposite the magnetic torque of said coil upon energization thereof.

8. The valve assembly defined in claim 1, wherein said rotor has a first journal comprising a ball race and a second journal comprising a pin.

9. The valve assembly defined in claim 1, wherein said rotor is balanced with a counterweight about the axis of rotation of said rotor.

10. A method of making and operating a rotary solenoid valve comprising:

(a) disposing a coil over a ferromagnetic pole piece and journalling a rotor having a plurality of pole segments for rotation on said tubular member;

(b) forming a valving chamber in a valve body with an inlet port and an outlet port and disposing a valve member in said chamber;

(c) disposing a cam on said rotor and contacting said valve member with said cam surface and moving said valve with respect to one of said ports;

(d) disposing said coil with said rotor journalled thereon on said body and completing a stator flux loop about said coil;

(e) energizing said coil and effecting rotary movement of said rotor and camming said valve member for controlling flow between said ports.

11. The method defined in claim 10, wherein said step of completing a flux loop includes disposing a cup-shaped ferromagnetic member over said coil.

12. The method defined in claim 10, wherein said step of journalling includes disposing a ball race on one end of said pole piece.

13. The method defined in claim 10, wherein said step of disposing a valve member includes disposing a spherical member adjacent one of said ports and camming said spherical member.

14. The method defined in claim 10, wherein said step of journalling includes counterbalancing said rotor about its axis of rotation.

15. A method of making and operating an electrically operated flow control valve comprising:

(a) disposing a plurality of ferromagnetic pole segments on a rotor and forming a cam on said rotor;

(b) disposing a pole piece in a coil and journalling said rotor on said pole piece;

(c) disposing a moveable valve member in a valve body having a valving chamber with an inlet and an outlet port;

(d) completing a flux loop about said coil with a ferromagnetic member;

(e) energizing said coil and magnetically effecting rotary movement of said rotor and contacting said valve member with said cam and moving said valve member with respect to one of said inlet and outlet ports and controlling flow between said inlet and outlet ports.

16. The method defined in claim 15, wherein said step of journalling said rotor includes disposing a ball race about said rotor.

17. The method defined in claim 15, wherein said step of disposing a moveable valve member includes disposing a spherical member adjacent one of said ports.

18. The method defined in claim 15, wherein said step of journalling said rotor includes counterweighting and balancing said rotor.

19. A method of controlling purge flow from a vapor canister to an engine inlet comprising:

(a) forming a valve body with valving chamber having an inlet for connection to the canister and an outlet for connection to the engine inlet and disposing a moveable valve member in said chamber;

(b) forming a rotor having a plurality of pole segments of magnetizable material and disposing a cam on said rotor;

(c) disposing a coil over a pole piece and journalling said rotor on said pole piece;

(d) disposing a stator over said coil and forming salient stator poles and defining air gaps with said rotor pole segments; and, (e) energizing said coil and rotating said cam and contacting said valve member with said cam and moving said valve member in a direction transverse to the axis of rotation of said rotor and controlling flow between said inlet and outlet.

* * * * *